United States Patent [19]

Haring, deceased

[11] Patent Number: 5,103,645

[45] Date of Patent: Apr. 14, 1992

[54] INTERNAL COMBUSTION ENGINE AND METHOD

[75] Inventor: John M. Haring, deceased, late of Bastrop, Tex., by Betty Jean Haring, Robert Thomas Haring, Independent Co-Administrator

[73] Assignee: Thermon Manufacturing Company, San Marcos, Tex.

[21] Appl. No.: 708,837

[22] Filed: Jun. 6, 1991

Related U.S. Application Data

[63] Continuation-in-part of Ser. No. 542,433, Jun. 22, 1990, abandoned.

[51] Int. Cl.⁵ .................... F02B 33/02; F02G 3/02
[52] U.S. Cl. ........................ 60/620; 123/68; 123/500
[58] Field of Search ............ 60/620, 621, 622, 605.1, 60/624; 123/299, 500, 501, 502, 503, 504, 560, 68

[56] References Cited

U.S. PATENT DOCUMENTS

| | | | |
|---|---|---|---|
| 1,825,525 | 9/1931 | Johansson | 123/68 |
| 1,865,099 | 6/1932 | Groff | 123/500 |
| 2,101,064 | 12/1937 | Hautzenroeder | 123/500 |
| 2,239,922 | 4/1941 | Martinka | 60/620 |
| 2,255,925 | 9/1941 | Heylandt | 60/620 |
| 2,309,968 | 2/1943 | Marburg | 60/620 |
| 3,267,661 | 8/1966 | Petrie | 60/620 |
| 4,157,080 | 6/1979 | Hill | 60/624 |
| 4,186,561 | 2/1980 | Wishart | 60/620 |
| 4,473,051 | 9/1984 | Chorman | 123/68 X |
| 4,481,772 | 11/1984 | Benaroya | 60/595 |

FOREIGN PATENT DOCUMENTS 2402682 7/1974 Fed. Rep. of Germany ........ 60/620

*Primary Examiner*—Michael Koczo
*Attorney, Agent, or Firm*—James F. Weiler

[57] ABSTRACT

Disclosed are methods of and means for an improved internal combustion engine performance and of substantially reduced or eliminated pollutants. A relatively slow and long burning combustion is provided which produces an exhaust of high pressure which can be utilized to drive a turbocharger or cylinder or subsequent cylinders. Ideally, the compression ratio is reduced with respect to current internal combustion engines, and the maximum temperature in the power or combustion cylinder can be below the temperature at which $NO_x$ is formed. Preferably the pressure during combustion remains substantially constant and the air or air/fuel mixture is externally compressed 40 to 100% of its compression pressure in the combustion cylinder. This results in a controlled energy release tailored to a change in volume per unit of time which results in more torque and horsepower, less fuel consumption and drastically decreases pollution, both chemical and heat to the atmosphere. A number of preferred embodiments are disclosed.

47 Claims, 8 Drawing Sheets

5 = Io@TDC
6 = Ic@25°ABDC
7 = Eo@52° BBDC
8 = Ec@28°ATDC

5 = Io @ 2°ATDC
6 = Ic @ 23°ABDC
7 = Eo @ 27°BBDC
8 = Ec @ 1°ATDC

1 = COMBUSTION STARTS @ TDC
2 = FUEL INJECTION ENDS @ 70° ATDC
3 = COMBUSTION ENDS @ 90° ATDC
4 = EXHAUST VALVE OPENS @ 160° ATDC
5 = INTAKE VALVE OPENS @ 330° ATDC
6 = EXHAUST VALVE CLOSES @ 12° BTDC
7 = INTAKE VALVE CLOSES @ 10° BTDC
8 = FUEL INJECTION BEGINS @ 5° BTDC

INTERNAL COMBUSTION ENGINE AND METHOD

REFERENCE TO RELATED APPLICATION

The present application is a continuation-in-part of U.S. application Ser. No. 07/542,433 filed June 22, 1990, abandoned.

FIELD OF THE INVENTION

The field of the invention is internal combustion engines, both Otto and Diesel cycle, large and small, movable and stationary, such as presently used in automobiles and trucks as well as all other types of internal combustion engines.

BACKGROUND OF THE INVENTION

Both the Otto and Diesel cycle engines accomplish their purposes via parameters or strokes, which follow one another in a defined order: (1) intake stroke, (2) compression stroke, (3) power or firing stroke, and (4) exhaust stroke. Each of these four parameters are performed in each power cylinder of a multi cylinder Otto or Diesel cycle engine. Each of these cycles can be further classified as a "two-stroke cycle" which achieves all of these parameters or "strokes" in one revolution of the crank shaft, or "four stroke cycle" which achieves all of these parameters or "strokes" in two revolutions of the crank shaft.

In a four stroke internal combustion engine operating on the Otto cycle, a mixture of air and vaporized fuel is inducted or forced into a combustion cylinder or cylinders when the piston is traveling downward on the intake stroke. The mixture is compressed as the piston comes up on the compression stroke. The mixture is then ignited by a spark plug at or near top dead center of the piston. Combustion takes place at a constant volume creating a high pressure and temperature in the cylinder thereby forcing the piston down and producing work. According to Benson, Rowland and Whitehouse, N.D., "Internal Combustion Engines," New York: Pergamon Press, 1979, p 17, the normal total duration of combustion is usually about 30°-40° crank angle. It can be seen in FIG. 9, however, that the combustion pressure remains substantially constant for only a very short crank angle duration. After the piston reaches the bottom of the cylinder, the burned gases are exhausted from the cylinder through an open valve by the piston on its last stroke up in the cylinder. After the exhaust stroke, the entire procedure repeats itself continuously until the process is interrupted usually by opening the electrical circuit of the spark plug.

In a four stroke internal combustion engine operating on the Diesel cycle, air is inducted or forced into a combustion cylinder or cylinders when the piston is traveling downward on the intake stroke. The air is compressed as the piston comes up on the compression stroke. Fuel is injected at or near top dead center of the piston and continues to a predesignated stopping point usually around 15°-20° after top dead center. Combustion takes place at a constant pressure creating a high pressure and temperature in the cylinder thereby forcing the piston down and producing work. According to Heywood, John B., "Combustion Engine Fundamentals," New York: McGraw-Hill Book Company, 1988, p. 493, the normal total duration of combustion is usually about 40°-50° crank angle. It can be seen in FIG. 10, however, that the combustion pressure remains substantially constant for only a very short crank angle duration. After the piston reaches the bottom of the cylinder, the burned gases are exhausted from the cylinder through an open valve by the piston on its last stroke up in the cylinder. After the exhaust stroke, the entire procedure repeats itself continuously until the process is interrupted usually by stopping the flow of the fuel.

Each of the above type of engine can be provided as naturally aspirated, supercharged or turbocharged, intercooled and/or after cooled. Superchargers and turbochargers both allow more mass of air to be trapped within a given engine size, bore, stroke, and rpm. Intercoolers and aftercoolers also allow more air to be trapped in a given engine size, bore and rpm.

In general, more air mixed with more fuel at a combustible air fuel ratio allows an engine to produce more brake horsepower (Bhp) output. Other than exceeding mechanical design limitations, the only end point to producing more and more Bhp from an Otto or Diesel cycle engine by introducing more air and more fuel to any given engine is detonation.

Detonation occurs when the unburned air/fuel mixture ahead of the flame front is heated to its autoignition temperature. Then, all of the unburned mixture can burn up in less than a thousandth of a second. This is comparable to an explosion, and peak firing pressures of several hundred psi can become several thousand psi, damaging or destroying the engine. Therefore, for any Otto cycle as well as any Diesel cycle engine, the limit of increasing horsepower via adding more and more air fuel mixture to any such engine is detonation. The autoignition temperature for various fuels is readily available and shown in the following table from J. H. Perrys ChE Handbook, pp. 9-31 through 9-33.

TABLE 1

Tabulation of Autoignition Temperatures -- Various Hydrocarbons at Atmospheric Pressure

| Fuel | Formula | A.I.T., °F. |
|---|---|---|
| Methane | $CH_4$ | 1170 |
| Ethane | $C_2H_6$ | 882 |
| Propane | $C_3H_8$ | 940 |
| N-Butane | $C_4H_{10}$ | 807 |
| N-Pentane | $C_5H_{12}$ | 544 |
| N-Hexane | $C_6H_{14}$ | 501 |
| N-Heptane | $C_7H_{16}$ | 477 |
| N-Octane | $C_8H_{18}$ | 464 |
| Gasoline | 73 Octane | 570 |
| Gasoline | 100 Octane | 800-950 |

PRIOR ART

The following patents represent the most pertinent art developed in searches of the subject matter of the present invention.

U.S. Pat. Nos. 1,087,042; 2,372,272; and 3,232,042 disclose internal combustion engines wherein the fuel and air mixture is compressed, passed through a cooler and forced into the engine's cylinders.

U.S. Pat. Nos. 2,581,334 and 2,516,911 disclose engine air induction control systems wherein an independently driven blower compresses the combustion air which is subsequently passed through an intercooler and then into the engine.

The following patents disclose internal combustion engines having multiple stages of compression and expansion: 729,984; 1,152,386; 1,369,511; 1,612,056;

1,751,385; 2,551,478; 2,621,473; 3,267,661; 3,608,307; 3,675,630; 4,250,850; and 4,783,966.

The following patents further illustrate the development of the art with respect to internal combustion engines which utilize super charging devices and coolers to control the combustion air and/or fuel mixture which subsequently controls engine temperatures and pressures: 1,807,042; 1,935,186; 2,136,964; 2,372,272; 2,399,310; 2,403,398; 2,516,911; 2,581,334; 2,622,571; 2,703,560; 2,706,472; 2,896,598; 3,134,371; 3,177,856; 3,232,042; 3,483,854; 4,106,285; 4,211,082; 4,236,492; 4,317,439; 4,385,496; and 4,539,815.

These internal combustion engines are all high compression engines with relatively short times of combustion and at high temperatures and pressures, high fuel consumption, high exhaust gas temperatures and chemical pollutants, such as CO, $CO_2$ and $NO_x$.

None of the foregoing patents, or any prior art of which applicant is aware, discloses or suggests the present invention with its advantages.

SUMMARY OF THE INVENTION

The present invention is directed to improving internal combustion engines by an improved engine cycle, hereinafter sometimes referred to as the "Haring Cycle," in which detonation is completely eliminated as an end point in producing Bhp.

In the present invention, a relatively slow and long burning combustion or power cycle is provided which provides an exhaust at high pressure which can be utilized to drive a turbocharger or subsequent cylinder or cylinders. In other words, the elapsed time of combustion (ETC) at substantially constant pressure is extended and is longer than in present internal combustion engines. Also, the compression ratio is reduced compared to current internal combustion engines, and the maximum temperature in the power or combustion cylinder can readily be below the temperature at which $NO_x$ is formed. Ideally, the pressure during combustion remains substantially constant. This results in a controlled energy release tailored to a change in volume per unit of time, all of which results in more torque and horsepower, less fuel consumption and drastically decreases pollution to the atmosphere.

The introduction of cooled compressed air or air/fuel mixture allows for controlled combustion to take place at a substantially constant pressure over a sustained period of time. "Substantially constant pressure" as referred to herein means a pressure that is maintained within a range of 20% of the maximum controlled combustion pressure. FIG. 10 provides an example of the controlled combustion range for a diesel cycle engine.

Elapsed time of combustion at a substantially constant pressure is meant that a substantial portion of the combustion occurs at substantially constant pressure since total time of combustion includes preliminary combustion, fast combustion, tail end combustion or stages of combustion. In other words, the substantially constant pressure portion of combustion should be extended to at least a minimum crank angle duration of 45° after top dead center. The entire combustion process is not necessarily at substantially constant pressure.

The underlying basic concepts applicable to the present invention are that engine power is produced by burning an air/fuel mixture, that maximum power output is no longer limited by the maximum amount of mixture that can be burned without detonation, that detonation is controlled by the temperature of the combustible air/fuel mixture, and that extending the elapsed time of combustion (ETC) to provide more pressure as the effective moment arm is being increased substantially increases torque. The ETC has a minimum crank angle of 45° at substantially constant pressure. Preferably, the combustion extends from a starting range of 35° before TDC to 35° after TDC until an ending range of 45° to 180° or more after TDC. For example, the combustion begins within a starting range from 35° before top dead center to 35° after top dead center and can end within ranges such as 45° to 90°, 90° to 180° or 45° to 200° after top dead center. Working with the premise that combustion is basically a chemical reaction, and that the rate of this chemical reaction increases in speed as the initial temperature is increased, the reaction is controlled by cooling the air/fuel mixture prior to ignition below a point where detonation can occur during the burning period, reducing the peak firing pressure when the piston is near top dead center and increasing the cylinder pressure over that ordinarily obtained once the angularity of the connecting rod and crank pin center line is such that the transmitted force from the piston will have an appreciable lever arm, so as to create more torque, and thus more horsepower.

In one aspect of the present invention, the combustion air and/or air/fuel mixture is compressed externally to pressures of 40% to 100% of the final compression pressure of the combustion cylinder and then introduced into the combustion cylinder and does not rely on the combustion cylinder for substantially all of its compression. Also, the combustion air and/or air/fuel mixture is cooled externally of the combustion cylinder to a temperature which is effective to maintain the compressed air when mixed with the fuel to form a cooled air/fuel mixture which would not reach its autoignition temperature ahead of the flame front during burning or combustion thereof in the combustion cylinder. This completely eliminates any chance of the air/fuel mixture ahead of the flame front from reaching its autoignition temperature and detonating.

The fixed combustion cylinder volume at top dead center is increased so that as the piston starts accelerating downwardly, the change in volume per change of time (dV/dT) is decreased thus reducing the cylinder pressure at a much slower rate than by having a much smaller volume at top dead center as in the current higher compression ratio Otto and Diesel cycle engines. Preferably, the fuel is introduced into the combustion cylinder at a timed rate extending from a range starting at 45° before top dead center to 35° after top dead center of the piston and continues up to as much as 180° or more, such as 200°, after top dead center thereby permitting an extended and slow burning power cycle (ETC) of at least a duration of 45° of crank angle thereby increasing torque with little to no loss in combustion pressure and exhausting the combustion products from the combustion cylinder which are still at a relatively high pressure which can be utilized further to produce additional torque output via a second or third expansion, such as by piston or rotary devices. The fuel can be introduced into the combustion chamber intermittently during combustion to provide a controlled energy release to maintain the peak combustion temperature below 1800° F. or the approximate temperature at which $NO_x$ forms. Thus, the exhaust pressure from the second or third stage expansion can become the driving force for the first stage of compression for the next power stroke before being muffled and then exhausted to the atmosphere.

In one aspect of the invention, the compression stage and mixture cooling system are separated from the combustion cylinder systems, which assists in controlling the rate of combustion, and consequently the ETC, peak firing pressure, instantaneous shock and strain levels, torque output, air pressure and temperature, fuel consumption rates, combustion efficiency, scavenging efficiency, exhaust pollution and heat rejection incidences. These can be effectively controlled with appropriate manual or automatic adjustments or controls. The Haring Cycle utilizes external compression with external cooling since there is no present method or means to remove sufficient heat from the compressed air while it remains in the combustion cylinder as presently used in Otto or Diesel cycle engines, even with turbochargers and inter coolers or after coolers. An external compressor, especially designed for the compressing function, is considerably more efficient than the use of the combustion cylinder for compression during one cycle of the engine. Also, the use of external compression allows the engine operator to vary from appropriate settings for maximum power to maximum efficiency, which can be done on the same engine by varying the injection pressure, temperature, cylinder volume at the beginning and end of the injection, and timing of the ignition. As used herein, external does not necessarily contemplate a completely separate machine but only externally of the combustion cylinder.

In another aspect of the invention, the ETC is increased by increasing the time of injection from beginning to end which decreases the peak firing pressure when the piston is near top dead center and increases pressure over that ordinarily obtainable, once the angularity of the connecting rod and crank pin center line is such that the transmitted force from the piston will have an appreciable lever arm, so as to produce more torque and more horsepower. This is accomplished by varying and controlling the pressure, temperature, volume and ETC during combustion.

Accordingly, it is an object of the present invention to improve internal combustion engine performance and operation over that of the Diesel, Otto or Wankel engines while at the same time reducing exhaust pollution and heat rejection to the atmosphere.

Further objects of the present invention are to provide an internal combustion engine which when compared to physically comparably-sized Otto or Diesel cycle engines has increased available horsepower, reduced peak firing pressure, reduced shock and strain on mechanical parts, reduced fuel consumption rates, reduced heat rejection rates, reduced exhaust gas temperature, reduced exhaust gas pollutants, reduced operating costs, increased overall efficiency, and reduced capital costs for available power.

A further object of the present invention is to provide such an engine with the foregoing advantages which has the capability to burn fuels, such as grain alcohol from agricultural products, which are difficult to use in conventional engines, and to use fuels having lower detonation temperatures not suitable for Otto and Diesel cycle engines.

It is an object of the present invention to provide a method of improving and means for improving performance of and decreasing pollutants from an internal combustion engine by compressing air or an air/fuel mixture externally of the combustion cylinder to pressures of the order of 40% to 100% of the final compression pressure and cooling the compressed air or compressed air/fuel mixture to a temperature which is effective to maintain its temperature when mixed with the fuel to form a combustible air/fuel mixture ahead of the flame front below its autoignition temperature during combustion in the combustion cylinder thereby providing the advantages previously mentioned.

It is yet a further object of the present invention to provide a method of and a means for improving performance and decreasing pollutants from an internal combustion engine in which the externally compressed and cooled air is introduced into the combustion cylinder before top dead center of the piston therein and the fuel is introduced into the power cylinder at a timed rate extending from a range starting at 45° before top dead center to 35° after top dead center to as much as 180° or more thereby permitting an extended and slow burning power cycle (ETC) at substantially constant pressure up to at least 45° of crank angle after TDC thereby producing more torque and more horsepower.

A further object of the present invention is the provision of a method of and means for improving performance of and decreasing pollutants from an internal combustion engine by increasing the fixed combustion cylinder volume at top dead center so that, as the piston starts accelerating in its power stroke, the change in volume per the change in time (dV/dT) is decreased at a much slower rate thereby maintaining more cylinder pressure through the power stroke than by having a much smaller volume at top dead center as in current Otto and Diesel cycles.

A further object of the present invention is a method of improving performance of and decreasing pollutants from an internal combustion engine by controlling and timing the fuel injections so that the fuel is not all injected almost immediately as in the Otto and Diesel cycles thereby increasing the elapsed time of combustion.

It is a further object of the present invention to provide such a method and means so that an engine designer can select any desirable maximum cylinder pressure required for the particular engine application, can select the fuel injection cutoff point in degrees after top dead center, can maintain an almost constant cylinder pressure from top dead center to the cutoff point which can be selected so that the total heat released from the combustion does not raise the cylinder temperature above 1800° F. thus forming minimal or no $NO_x$.

It is a further object of the present invention to provide such a method and means for any type of internal combustion engine with increased performance and efficiency capabilities as well as reduced fuel consumption rates and exhaust temperature and pollutants.

Other and further objects and features appear throughout the specification and claims.

DESCRIPTION OF PREFERRED EMBODIMENTS

The followings terms and definitions are recognized by the industry and are considered standard although the terms listed below do not necessarily refer to their literal meanings.

The terms "compressing externally of the combustion cylinder" or "external" or "externally" when describing the location of where compression is taking place means that either compression is taking place in a separate machine from that of the combustion cylinder, that compression is taking place in a common engine block but not in the combustion cylinder or cylinders themselves, or that compression is taking place inside the combustion cylinder itself without combustion on one stroke, then exhausted from the combustion cylinder, cooled, and then reintroduced into the combustion cylinder for combustion on a subsequent stroke.

The term "final compression pressure" means the compression pressure in the combustion cylinder before combustion.

The terms "introduction" and/or "injection" when referring to the fuel or the air/fuel mixture are used interchangeably and simply refer to providing the fuel or the air/fuel mixture to a combustion chamber or cylinder.

As previously mentioned, the present invention is directed to methods and means to provide a relatively slow and long burning combustion or power cycle which results in an exhaust of high pressure which can be used to drive subsequent cylinder or cylinders and/or turbochargers. The compression ratio is reduced and combustion temperatures can be below the approximate temperature at which $NO_x$ forms. Preferably, and ideally, the pressure during combustion remains substantially constant. This results in a controlled energy release producing more torque and horsepower, less fuel consumption and drastically decreases pollution, both chemical and heat, to the atmosphere. The invention is applicable to modifying existing engines and to new internal combustion engines.

Figure 1:
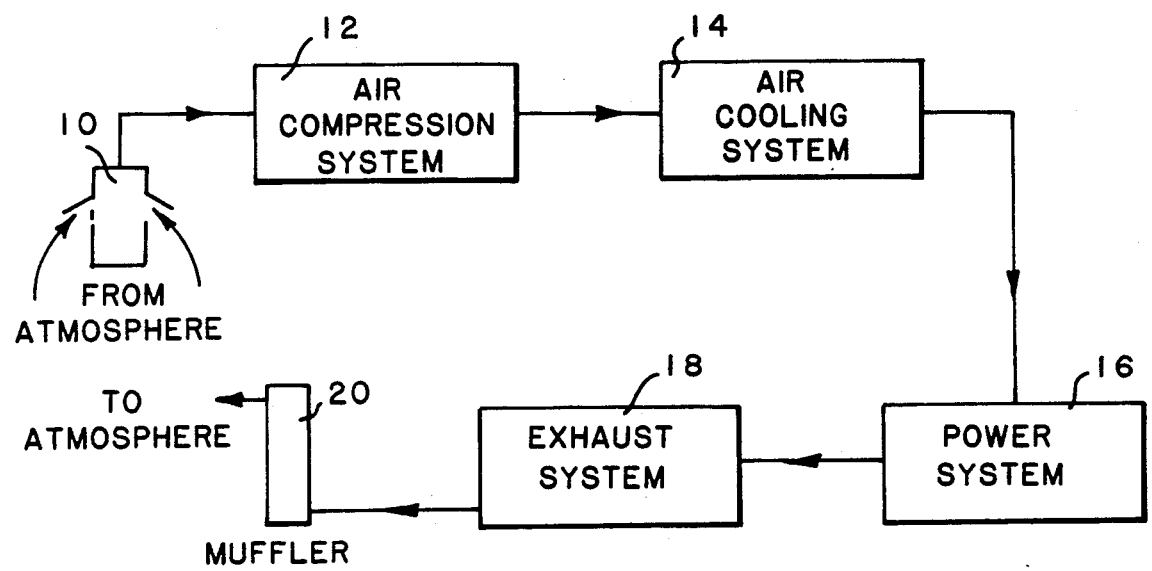
FIG. 1 is a schematic diagram of a typical Haring Cycle engine system according to the invention.

Referring now to FIG. 1 which illustrates preferred embodiments of both the method and the apparatus of the invention, a conventional air intake filter 10 can be utilized, but preferably one with a low pressure drop, to receive atmospheric air. The filtered air is then passed to the air compression system 12 for compressing the air externally of the power cylinder. The filtered atmospheric air is further compressed in the compressor 12 to 40% to 100% of the final compression pressure so that substantially all or most of the compression of the air is done externally of the combustion cylinder. The air compression system 12 can be selected to achieve the engine designer's purpose by using a single stage, multi stage, or any compressor type or arrangement to provide the maximum effective pressure for the combustion cylinder.

The compressed air and/or air/fuel is then introduced into the air cooling system 14 and is cooled to temperatures effective to maintain the compressed air when mixed with the fuel to form a combustible air/fuel mixture temperature ahead of the flame front below its autoignition temperature before or during combustion in the combustion cylinder, and preferably below a temperature of 1800° F. which is the approximate temperature at which $NO_x$ starts to form. The air cooling system 14 may be a single unit, or multi stage coolers as desired for maximum cooling efficiency.

The compressed and cooled air is then introduced into the power system or combustion cylinder 16, preferably before top dead center of the piston in the combustion cylinder 16. The fixed combustion cylinder volume at top dead center can be increased optimumly so that as the piston starts accelerating in the power stroke, the change in volume is decreased per change of time (dV/dT) which reduces the cylinder pressure as the volume increases over a much lower rate than by having a much smaller volume at top dead center as found in current, higher compression ratio Otto and Diesel cycles.

Preferably, the fuel is introduced into the combustion cylinder 16 at a timed rate extending from a range starting at 45° before to 35° after the top dead center of the piston and continuing to as much as 180° or more after the top dead center so that it is not all injected almost instantaneously as in current Otto and Diesel cycles. Delivery of the fuel or air/fuel mixture and combustion may continue to 180° after top dead center or more where engine designs require higher exhaust gas pressures/volumes to drive the expansion piston and/or subsequently the external air compressor.

By cooling the air prior to the start of combustion much cooler than in the Otto, Diesel or other cycles can presently do; by reducing dV/dT to a much slower rate than current Otto or Diesel cycles; and by controlling the fuel injection timing so that the rate of heat released from the combustion process is such that the changes in cylinder volume and cylinder pressure offset one another, a controlled energy release is produced which can be tailored to the requirements of a particular internal combustion engine providing more torque and horsepower, less fuel consumption and drastically reduced pollutants. In other words, as the rate of heat released tends to increase cylinder pressure, the rate of volume change tends to reduce cylinder pressure neutralizing and offsetting each other so that there is no substantial change in cylinder pressure during the combustion process resulting in the foregoing advantages.

Thus, an engine designer, using the Haring Cycle principle, can select any desired maximum cylinder pressure for any particular engine application, can then select the fuel injection cutoff point in degrees after top dead center, thereby maintaining an almost constant cylinder pressure from top dead center to the cutoff point. If the engine designer selects the cutoff points so that the total heat released does not raise the combustion temperature above 1800° F., very little, if any, $NO_x$ will be formed during the combustion process. In any event, the fuel rate, the exhaust temperature, the unburned hydrocarbons, CO, CO2 and $NO_x$ will be dramatically reduced over that of an Otto, Diesel or other cycles producing the same output power. Also, the designer can select an almost constant cylinder pressure from top dead center to a selected cutoff point so that combustion does not raise the cylinder temperature above 1800° F. or the approximate temperature at which $NO_x$ begins to form. Ideally, the pressure at bottom dead center or at the point where the exhaust valve or valves begin to open will not be below 30% of the substantially constant controlled combustion pressure.

The products of combustion from the power system 16 are passed into the exhaust system 18 which may or may not, as desired, recover pressure from the exhaust flow and become the driving force for the first stage of compression for the next power stroke before being muffled and exhausted to the atmosphere.

From the foregoing, it is seen that there is a greatly reduced exhaust gas temperature which is a major factor in reducing ozone depletion and the so called "greenhouse effect". Further, the best way to reduce fuel consumption rates is to reduce heat rejection rates to the atmosphere. Ideally, the fuel is used to maintain cylinder pressure rather than to create it; therefore, a Haring Cycle engine will run on much less fuel per brake horsepower than either a comparable size Otto, Diesel or other engine cycles.

Figure 2:
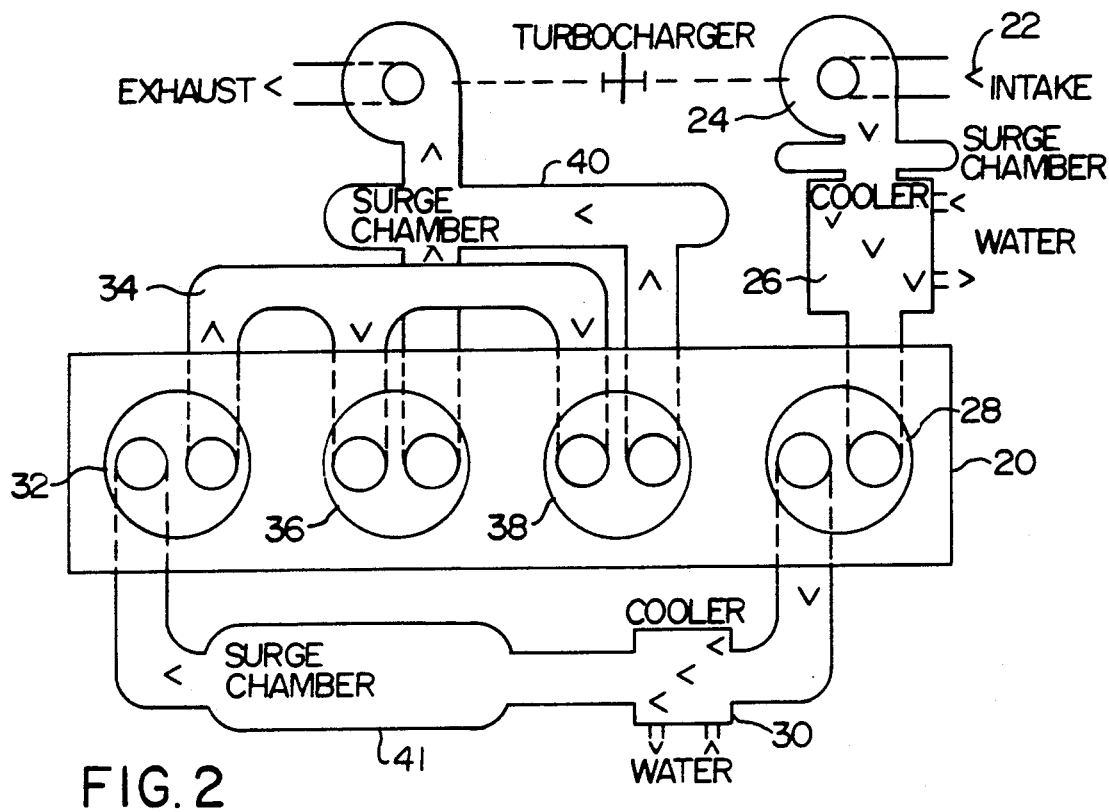
FIG. 2 is a top view schematic of a typical four cylinder internal combustion engine according to the invention.
Figure 3:
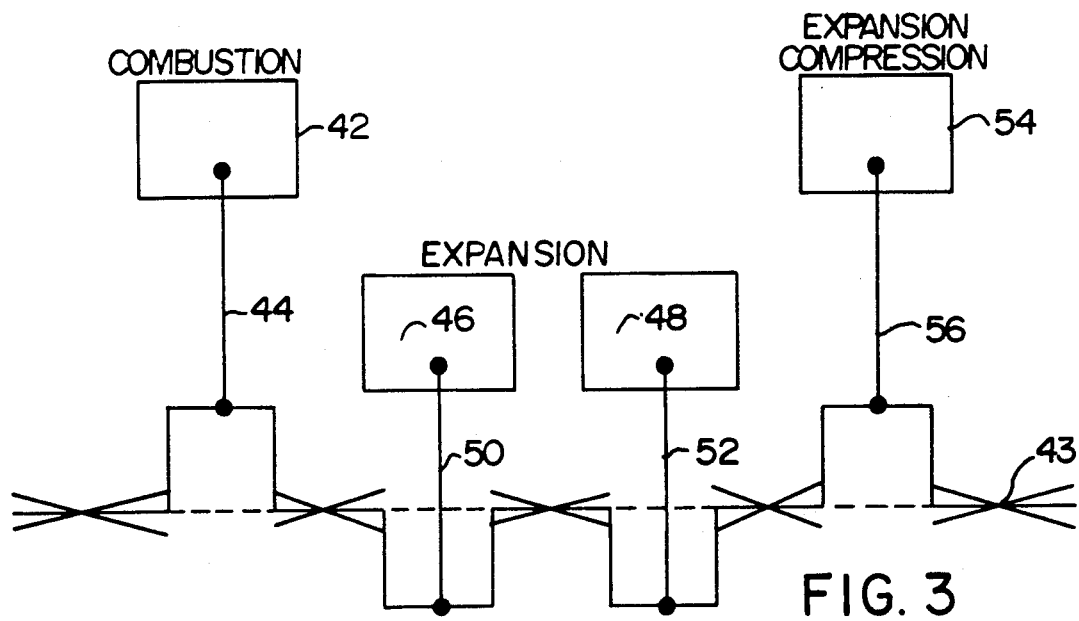
FIG. 3 is a schematic diagram of the engine of FIG. 2 illustrating relative positions of the pistons during combustion, expansion, and expansion and compression.

Referring now to FIGS. 2 and 3, a four cylinder test engine 20 was selected because it was available and convertible to the Haring Cycle which includes the air filter 22, the turbocharger 24, the cooler 26 from where the compressed and cooled air is introduced into the compression cylinder 28 of the engine 20 where it is further compressed and then passed through the cooler 30 where it is again cooled and then introduced into the combustion chamber or cylinder 32.

The products of combustion are exhausted in the exhaust manifold 34 into the expansion cylinders 36 and 38, and drive the expansion pistons 46 and 48, then are exhausted into the surge chamber 40 and further exhausted through a turbine or like device 41 to drive the compressor 24.

Referring to FIG. 3, a combustion or power piston 42 is disposed in the combustion cylinder 32 and is connected to the crank shaft 43 by the crank arm 44. Expansion pistons 46 and 48 are disposed in expansion cylinders 36 and 38 and are connected by the crank arms 50 and 52, respectively, to the crank shaft 43. An expansion/compression piston 54 is disposed in the expansion/compression cylinder 28 and connected to the crank shaft 43 by the crank arm 56.

It is thus seen, that the internal combustion engine 20 as illustrated in FIGS. 2 and 3 utilizes a single combustion or power chamber 32, two expansion chambers 36 and 38, and a compression chamber 28. The products of combustion are of sufficient pressure and volume when introduced into the two expansion chambers 36 and 38 to expand, and drive the pistons 46 and 48. After expansion in cylinders 36 and 38, the expanded products of combustion are introduced into the turbocharger 24 to initially compress the air.

As illustrated in FIG. 2, surge chambers may be provided as needed, such as those indicated at 40 and 41.

Figure 4:
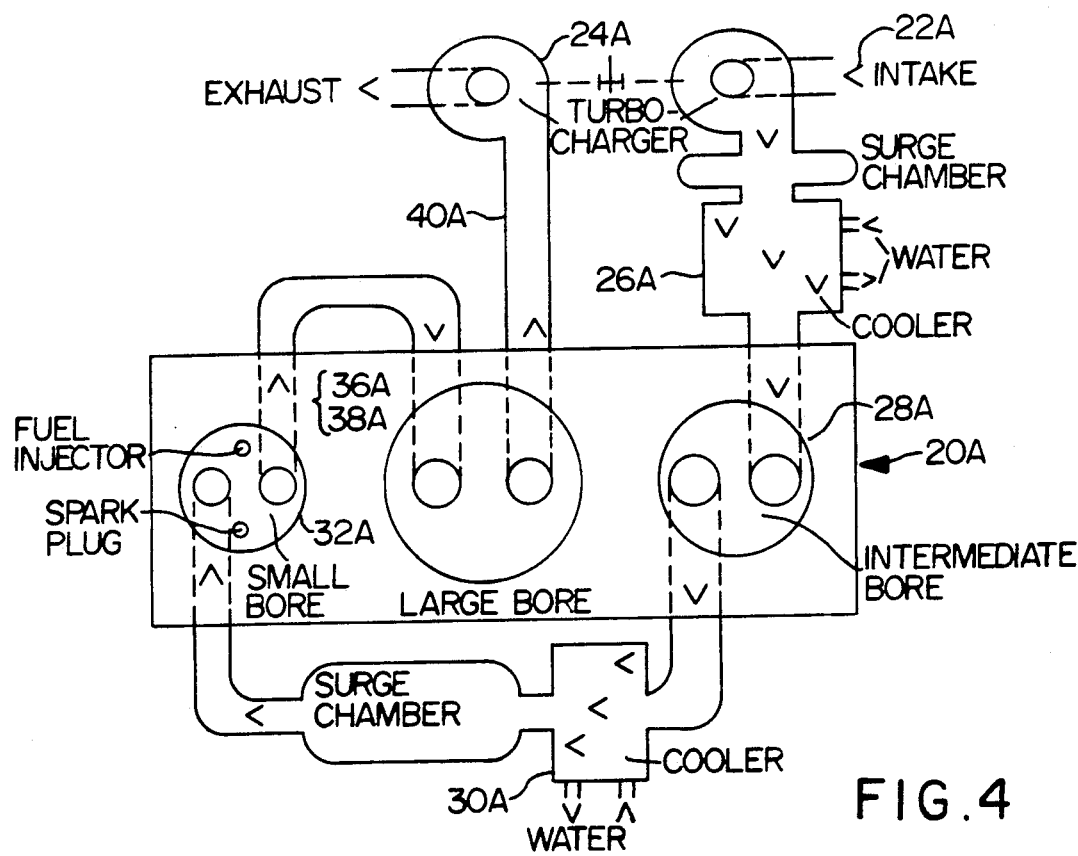
FIG. 4 is a view similar to that of FIG. 2 but illustrates a three cylinder internal combustion engine.
Figure 5:
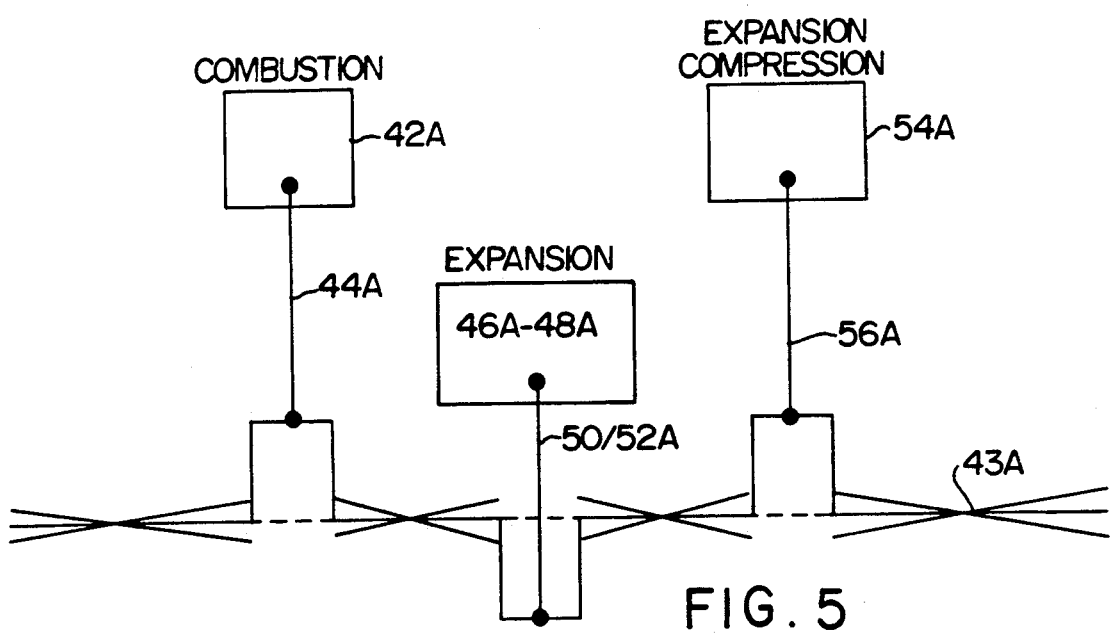
FIG. 5 is a view of a three cylinder Haring Cycle engine similar to that of FIG. 3 but illustrates the relative positions of the pistons during combustion, expansion and compression.

Referring now to FIGS. 4 and 5, where like reference numerals with the reference letter "a" are used to designate like components of FIGS. 2 and 3, a three cylinder internal combustion engine is illustrated which is substantially the same as that in FIGS. 2 and 3 except that the two expansion chambers 36 and 38 have been combined into a single enlarged expansion chamber 36a. The mode of operation and results are the same as that of the internal combustion engine of FIGS. 2 and 3; however, a much more compact internal combustion engine is provided having all of the features and advantages of that of FIGS. 2 and 3. Accordingly, no more description of the engine of FIGS. 4 and 5 is given or deemed necessary.

Figure 6:
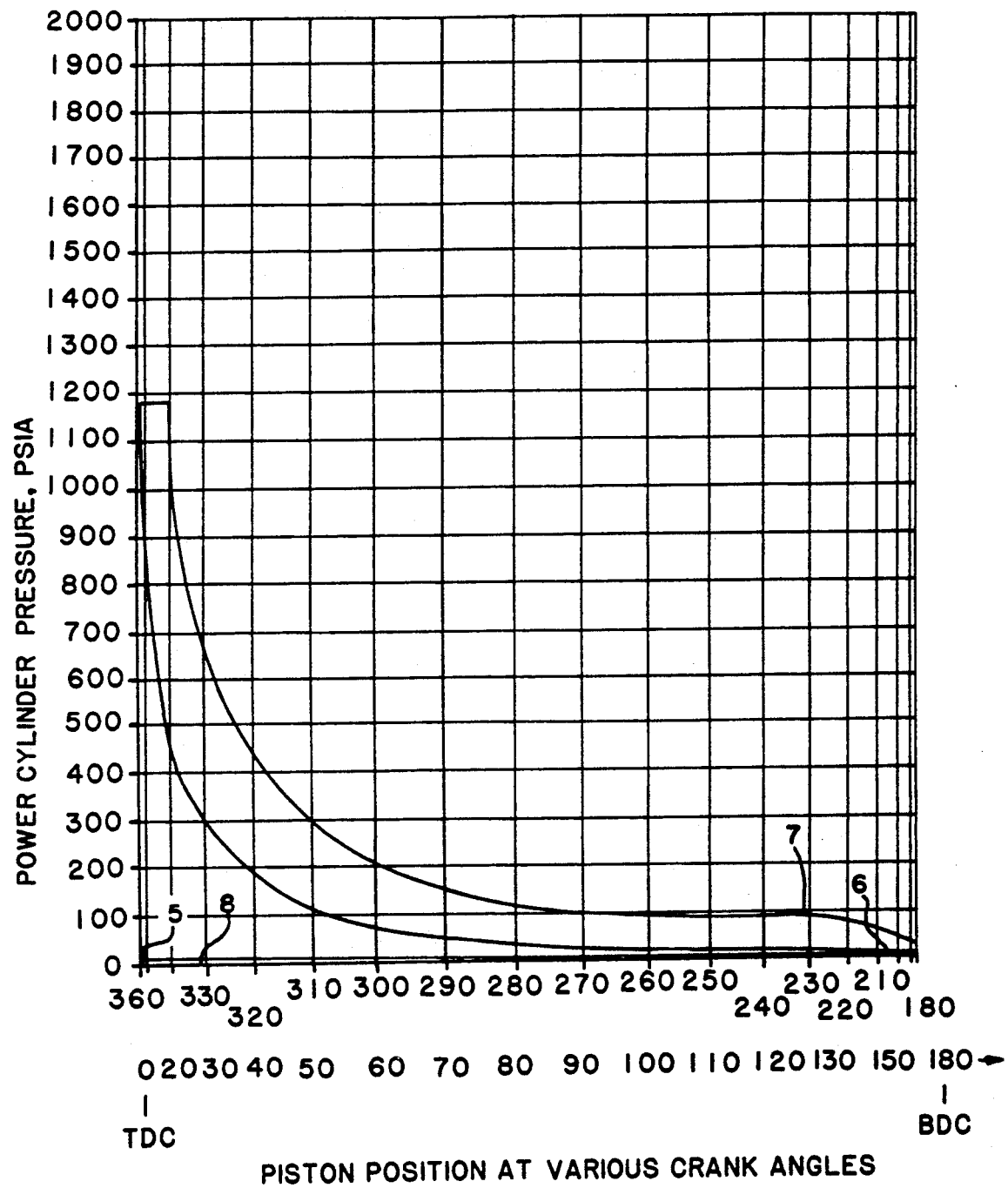
FIG. 6 is a pressure volume (PV) diagram of a conventional internal combustion Diesel engine.

Referring now to FIG. 6, a PV diagram is illustrated for a conventional Diesel engine. The engine was a Yanmar Diesel engine, Model TS50C, 4 cycle horizontal, had one power cylinder, a bore and stroke of 2.7559 inch $\times$ 2.7559 inch and had a rating of 4 horsepower at 2000 rpm. It had a compression ratio of 24.5/1, specific fuel consumption of 0.474 pounds per brake horsepower hour, had a combustion system including a precombustion chamber and the cooling system comprised an Ebullient cooling system with an air condenser.

As indicated in the PV diagram, the intake valve 5 opens at top dead center, and closes at 6, 25° after bottom dead center (ABDC), the exhaust valve 7 opens at 52° before bottom dead center (BBDC), and closes at 8, 28° after top dead center (ATDC).

Figure 7:
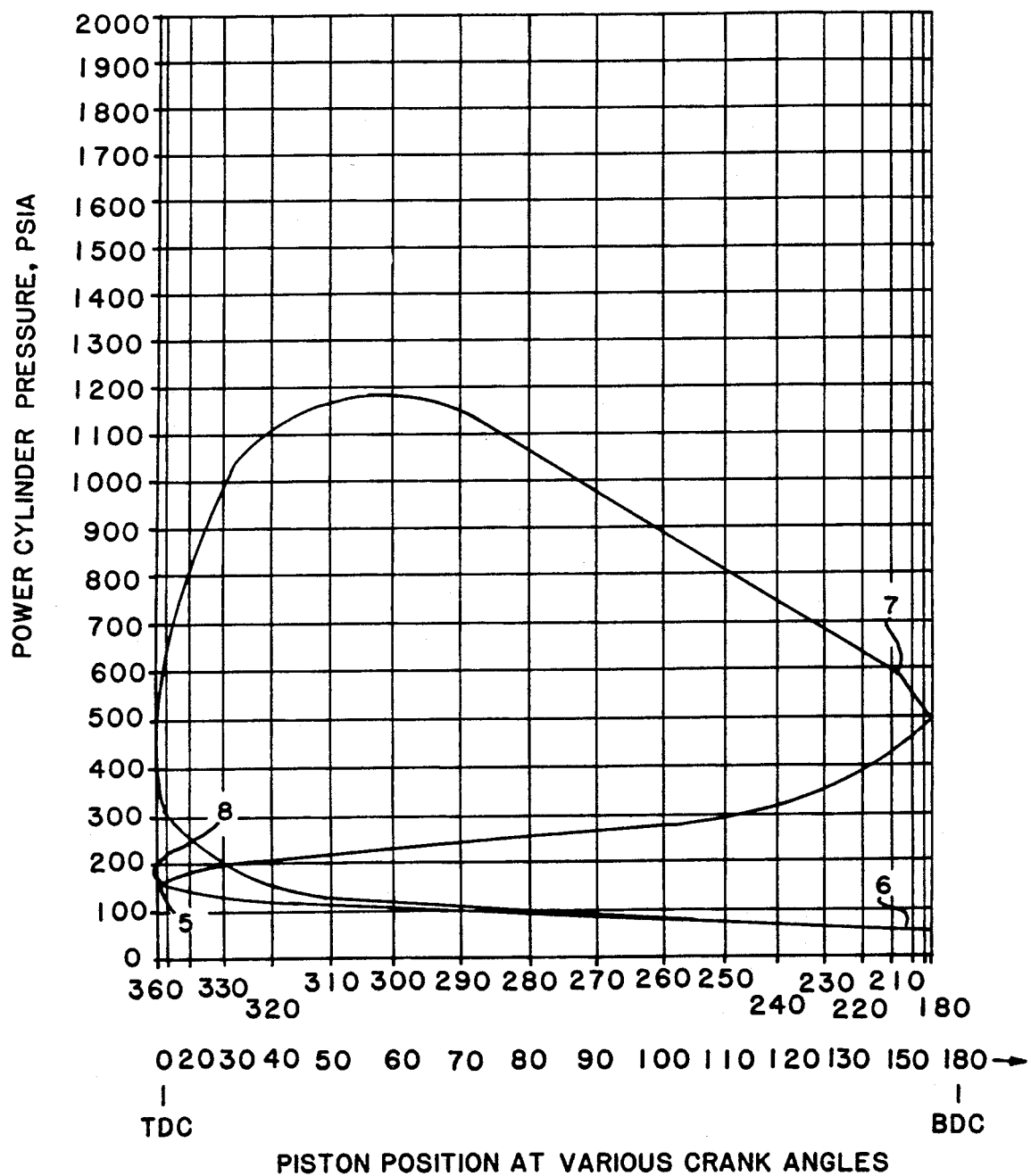
FIG. 7 is a pressure volume (PV) diagram of a Haring Cycle internal combustion test engine.

Referring now to FIG. 7, which is a PV diagram for the same Diesel engine modified as follows: The fixed cylinder volume at TDC was increased by the addition of 0.2375 inch thick steel spacer and 0.0625 inch extra gasket installed between the cylinder head and cylinder body. Longer push rods were made to compensate for the spacer plate and extra head gasket dimensions. The intake valve guide was threaded and a string packing gland with an adjustable nut was added to eliminate leakage past the intake valve stem. The valve timing was changed by increasing the tappet clearances to eliminate the "normal" 28° valve overlap at TDC. The fuel injector plunger pump was replaced by one which pumped almost three times the fuel volume per stroke as the normal pump without any change in the discharge orifice and spring. Approximately 1½ gallons per minute of city tap water was allowed to flow through the normal cooling water system to increase the cooling capacity for the engine. Shop air at 50 psi and 90° F. were piped to the intake valve inlet connection, using a hand operated throttle valve and a small volume tank upstream of the intake valve. The normal intake valve spring was replaced with a stiffer spring so that the valve would not blow open or leak when subjected to 50 psig inlet pressure.

The engine modifications were designed so that the maximum peak pressure would be close to the normal engine maximum pressure as shown in PV diagram, FIG. 6, to demonstrate the beneficial effects of increasing the elapsed time of combustion not that more Bhp via higher cylinder pressure could be obtained. Accordingly, the engine modifications were limited so that there was 50 psig air pressure provided and the original peak firing pressure, but a longer ETC. In the normal engine at 24.5/1 compression ratio indicated a compression pressure and temperature at TDC of 1,201.4 psia and 1,668° F. (FIG. 6). As indicated by the PV diagram (FIG. 7) the intake valve 5 opens at 2° ATDC and closes at 6, 23° ABDC, the exhaust valve 7 opens at 27° BBDC, and closes at 8, 1° ATDC. The PV card (FIG. 7) shows a maximum load of 27.48 power cylinder indicated horsepower with a maximum cylinder pressure of about 1190 psia. Also, as indicated by the PV card (FIG. 7), the exhaust valve 6 opened at about 600 psig cylinder pressure which can be utilized to perform work. The modified engine achieved 581% increase in brake horsepower output at slightly less than three times the original fuel usage. In addition, due to the drastically reduced peak firing temperatures by starting combustion at 700° F. instead of over 1600° F., and releasing fuel energy during combustion over a much longer period of time, or about 50% of crank rotation rather than approximately 5% of crank rotation of the normal engine, $NO_x$, which starts forming at approximately 1800° F. and then accelerates exponentially as temperature increases, in the exhaust was dramatically reduced if not entirely eliminated. The increased ETC, when judicially balanced with a reduced ratio of cylinder volume change to time change (dV/dT) allows the designer to tailor the shape of the PV diagram to meet his design objectives, from maximum power output to minimum fuel rate to minimum $NO_x$ in the exhaust, or any place in between.

Figure 8:
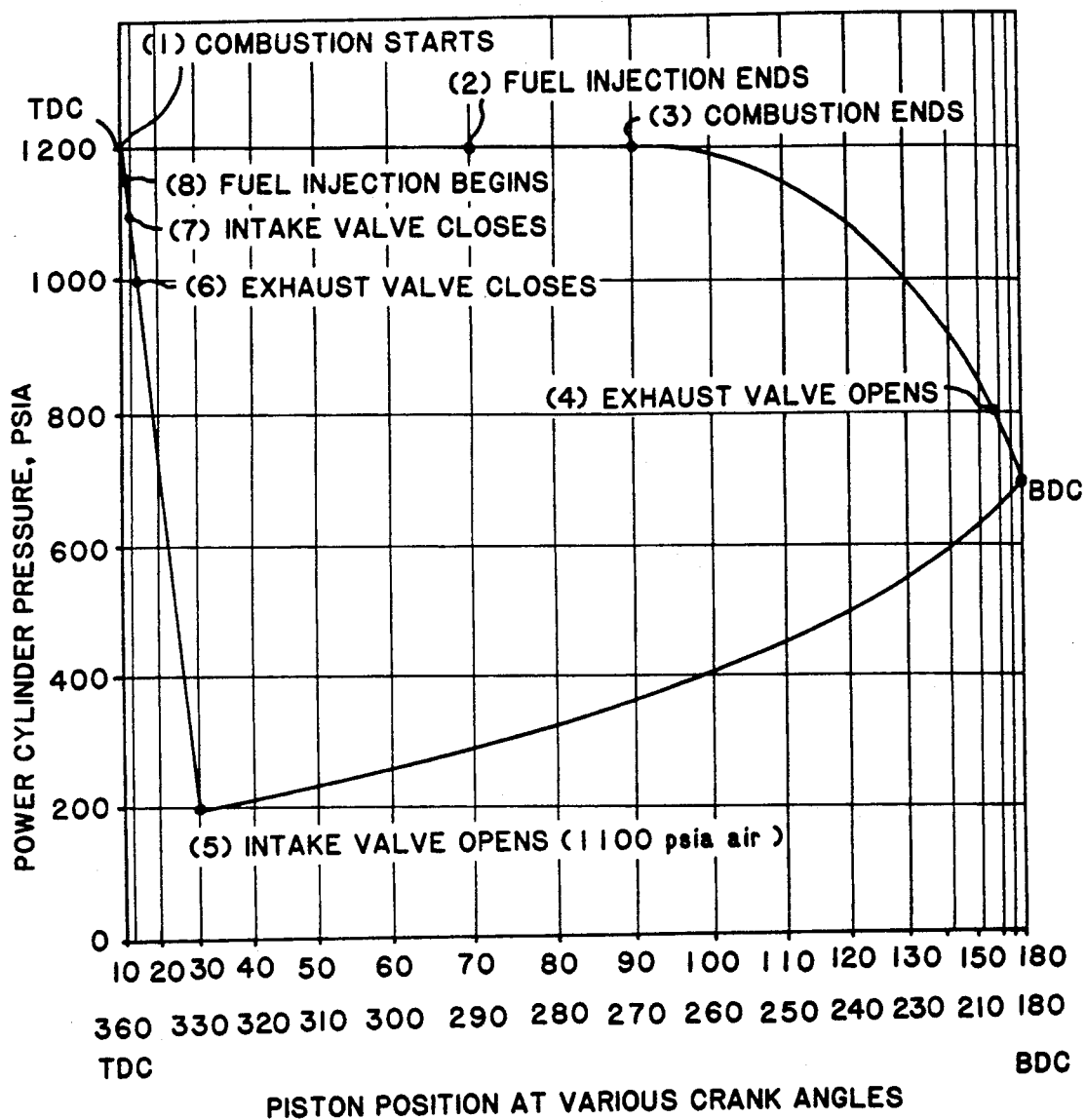
FIG. 8 is a theoretical pressure volume (PV) diagram of a preferred Haring Cycle engine as illustrated in FIGS. 4 and 5.

Referring now to FIG. 8 which is a theoretical PV diagram of the combustion cylinder of a preferred Haring Cycle engine having one small combustion cylinder, one large reexpansion cylinder and one intermediate size expansion/compression cylinder as illustrated in FIGS. 4 and 5. Intake valve 1 opens at and admits cool compressed air at 1100 psia into the combustion cylinder at a crank angle of 30° before TDC, the exhaust valve 2 closes at 12° before top dead center, the intake valve 3 closes at 10° before top dead center and fuel injection 4 begins at 5° before TDC. Combustion 5 starts at TDC and at a pressure of 1200 psia, fuel injection 6 ends at 70° after TDC, combustion at substantially constant pressure 7 ends at 90° crank angle, the exhaust valve 8 opens at 160° after TDC with an exhaust pressure of 800 psia which is passed into the expansion cylinder 36 of FIG. 4.

From the foregoing, it is apparent that the combustion cylinders 42 (FIG. 3) and 42a (FIG. 5) do very little compressing of the incoming air and that the combustion pressure remains substantially constant throughout 90° of crank angle providing more pressure as the effective moment arm is being increased substantially which increases torque, horsepower, and provides an exhaust pressure of 800 psia for further expansion.

While the PV diagram of FIG. 8 is theoretical, an engine designer can design an engine fueled by Diesel, gasoline or other types of fuels, to provide this or the desired PV diagram of the engine for the purpose desired using the Haring Cycle principles.

Figure 9:
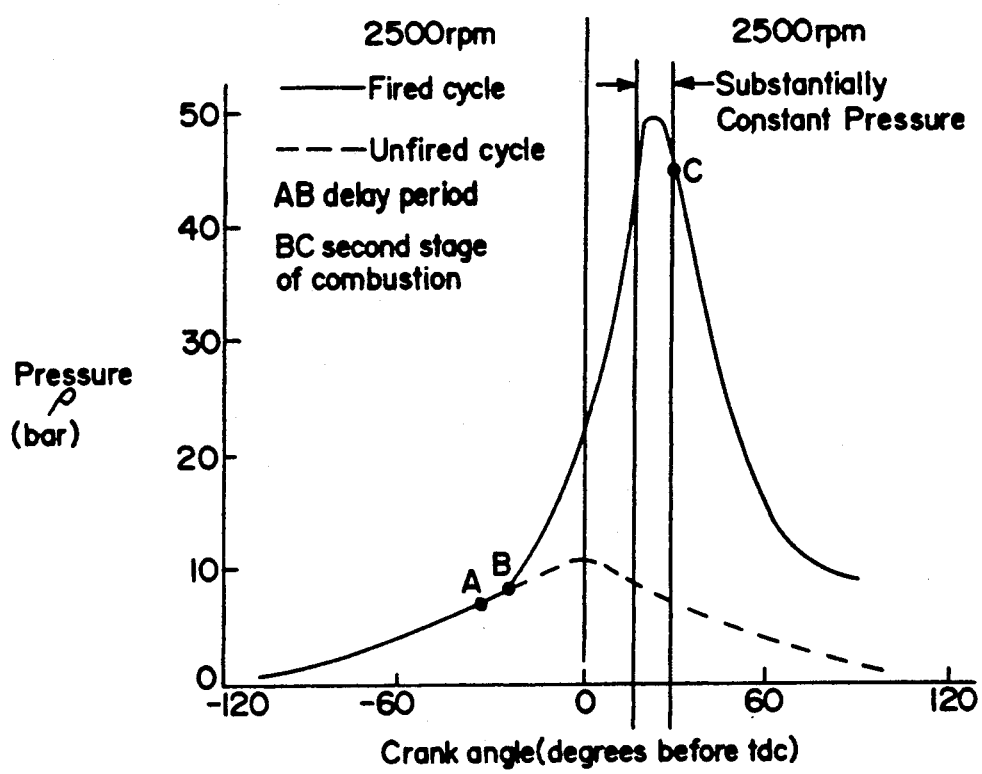
FIG. 9 is an Indicator Diagram for a compression engine for the Otto cycle from Stone, Richard, Introduction to Internal Combustion Engines, London, MacMillan Publishers Ltd., 1985, p. 65, with two vertical lines added for illustrating the duration of substantially constant pressure or controlled combustion.
Figure 10:
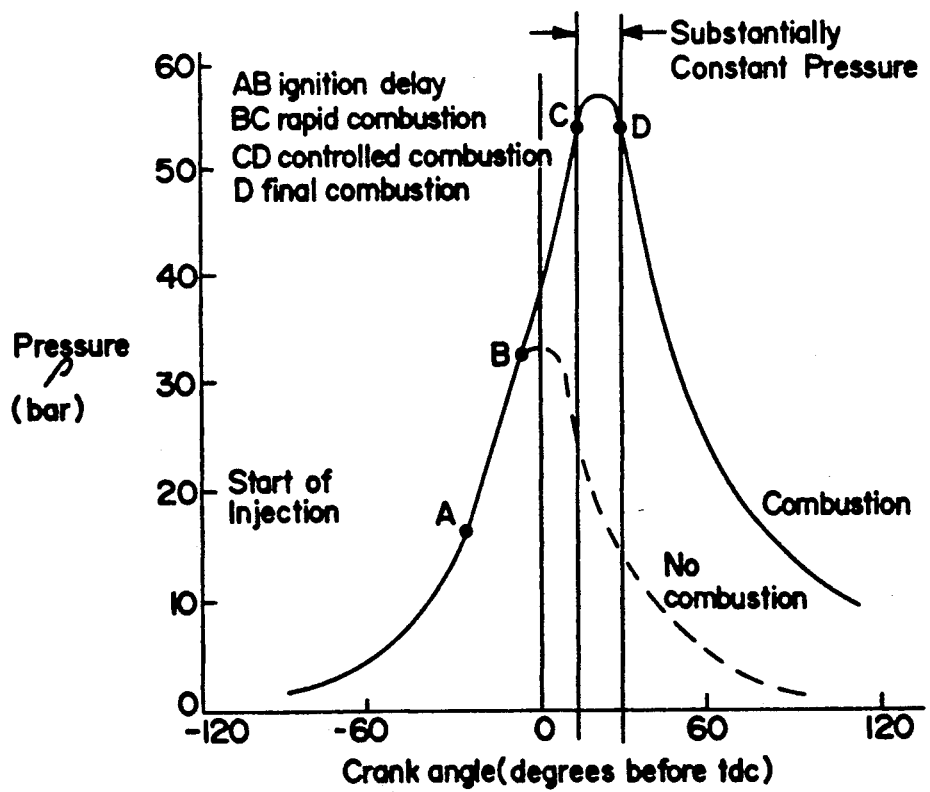
FIG. 10 is an Indicator Diagram for a compression ignition engine of the Diesel cycle from Stone, Richard, Introduction to Internal Combustion Engines, London, MacMillan Publishers Ltd., 1985, p. 65, with two vertical lines added illustrating the duration of substantially constant pressure or controlled combustion.
Figure 11:
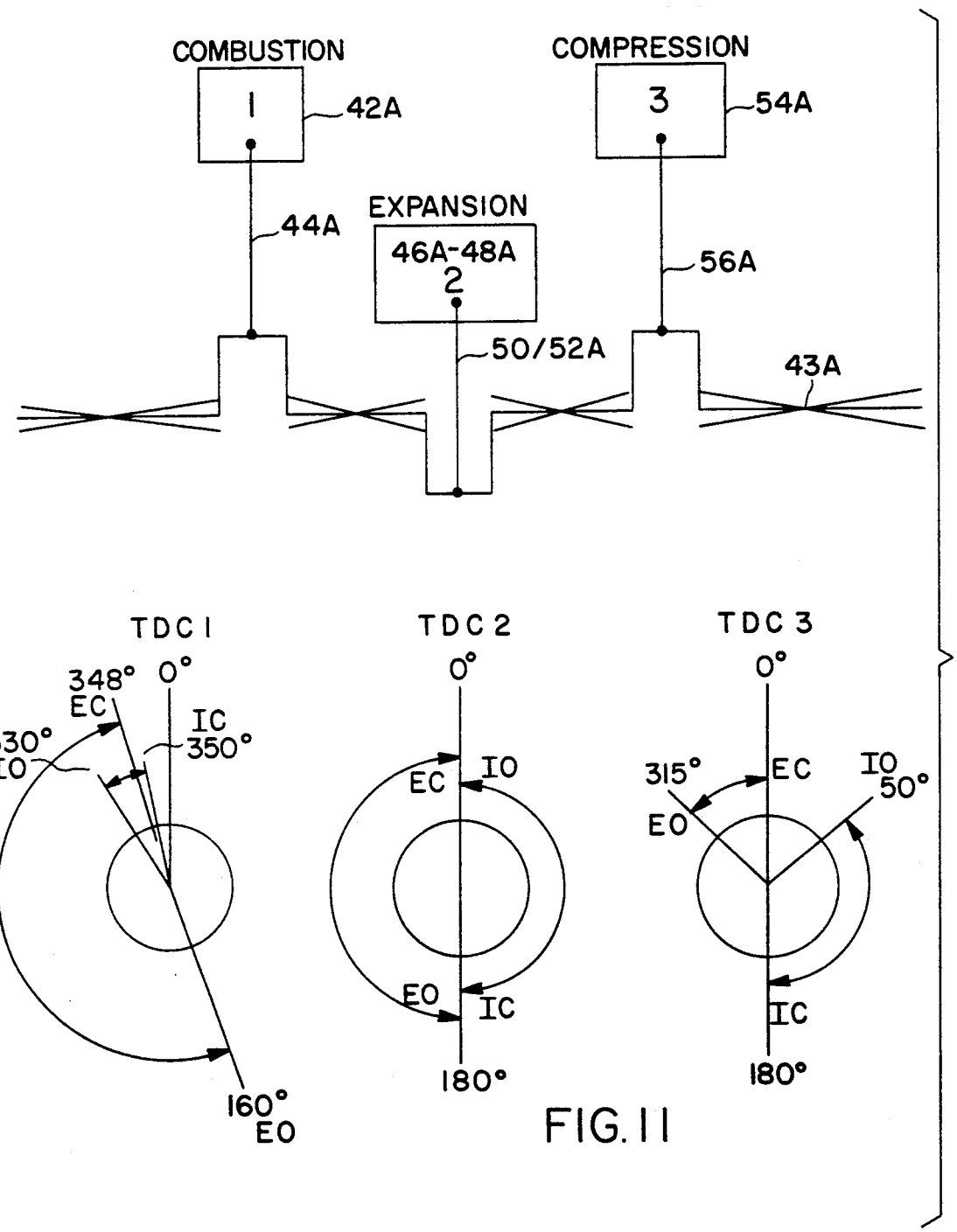
FIG. 11 is a diagrammatic view of FIG. 5 including charts indicating crank and piston positions within the three cylinder unit, indicating when the working fluid is transferred from one cylinder to the next.

Referring now to FIG. 9, it is seen that in a typical spark ignition engine (Otto cycle) the combustion pressures remain substantially constant for only a very short crank angle duration. Similarly, with reference to FIG. 10, in a conventional Diesel cycle the combustion pressure remains substantially constant for only a very short crank angle duration.

Other types of fuels which can be used include alcohol fuels derived from grain or other sources in vapor, liquid or dry state, including fuels with low autoignition temperatures considered unusable in the past.

The cooling may be accomplished by any suitable means, such as freon or ammonia refrigeration, waste heat refrigeration, air to air cooling, air to water cooling, water to water cooling and the like.

Many existing positive displacement engines including reciprocating and rotary engines can be upgraded using the Haring Cycle principles to provide the advantages set forth above such as by conversion kits and the like.

For convenience of disclosure, several features of the invention are shown in a drawing rather than in separate drawings, and one or more or all of the features may be included in an internal combustion engine.

The present invention, therefore, is well suited and adapted to attain the objects and ends and has the advantages and features mentioned as well as others inherent therein which are within the spirit of the invention and encompassed within the scope of the accompanying claims.

What is claimed is:

1. A method of increasing performance and eliminating detonation in an internal combustion engine comprising,
    combusting, in a combustion cylinder having a piston connected by a crank arm to a crank shaft, cooled compressed air mixed with fuel to form a combustible fuel mixture having a temperature below its autoignition temperature before combustion, the air/fuel mixture being sufficiently cool to prevent detonation of the mixture ahead of the flame front during combustion,
    introducing the fuel into the combustion chamber at a timed rate during the combustion whereby at least a portion of the combustion has an elapsed time of combustion at substantially constant pressure over a minimum crank angle duration of 45° after top dead center, and
    exhausting products of combustion from the combustion cylinder.

2. The method of claim 1 where,
    combustion begins within a starting range from 35° before top dead center to 35° after top dead center and ends within a range of 45° to 200° after top dead center.

3. The method of claim 2 where,
    combustion begins within a starting range from 35° before top dead center to 35° after top dead center and ends within a range from 45° to 90° after top dead center.

4. The method of claim 2 where,
    combustion begins within a starting range from 35° before top dead center to 35° after top dead center and ends within a range from 90° to 180° after top dead center.

5. The method of claim 2 where,
    combustion begins within a starting range from 35° before top dead center to 35° after top dead center and ends within a range from 180° to 200° after top dead center.

6. The method of claim 3 where,
    the fuel is introduced into the combustion cylinder at a timed rate extending from a range starting at 45° before top dead center to 35° after top dead center and ends within a range from 45° to 200° after top dead center.

7. The method of claim 6 where,
the fuel is introduced into the combustion cylinder at a timed rate from a range starting at 45° before top dead center to 35° after top dead center and ends within a range from 45° to 90° after top dead center.

8. The method of claim 6 where,
the fuel is introduced into the combustion cylinder at a timed rate from a range starting at 45° before top dead center to 35° after top dead center and ends within a range from 90° to 180° after top dead center.

9. The method of claim 6 where,
the fuel is introduced into the combustion cylinder at a timed rate from a range starting at 45° before top dead center to 35° after top dead center and ends within a range from 180° to 200° after top dead center.

10. The method of claim 1 including,
expanding the exhausted products of combustion in at least one expansion cylinder having a piston connected by a crank arm to a crank shaft thereby applying a driving force to the crank shaft.

11. The method of claim 10 including,
driving a compressor external of the expansion cylinder by the expanded products of combustion exhausted from the expansion cylinder to compress air, and
delivering the compressed air to a compression cylinder.

12. The method of claim 11 including,
cooling the compressed air from the compressor before delivering the air to the compression cylinder.

13. The method of claim 12 including,
introducing the cooled compressed air in the compression cylinder having a piston that is connected by a crank arm to the crank shaft, thereby applying a force to the crank shaft.

14. The method of claim 13 including,
increasing the pressure of the cooled compressed air by the compression stroke of the compression cylinder.

15. The method of claim 14 including,
cooling the compressed air delivered from the compression cylinder before introducing the compressed air of the air/fuel mixture into the combustion cylinder.

16. The method of claim 1 including,
controlling the timed rate of fuel injection, compression of the air, and temperature of the air/fuel mixture to maintain cylinder pressure after combustion at a minimum of 30% of the substantially constant combustion pressure until the piston reaches bottom dead center or until the beginning of exhausting the products of combustion from the cylinder.

17. A method of improving performance of, eliminating detonation in and decreasing pollutants from an internal combustion engine comprising,
compressing air from 40% to 100% of final compression pressure externally of a combustion cylinder having a piston connected by a crank arm to a crank shaft,
cooling the compressed air externally of the combustion cylinder to a temperature necessary to maintain, when mixed with fuel to form a combustible air/fuel mixture, a temperature below its autoignition temperature before combustion in the combustion cylinder, and to a temperature sufficiently cool to prevent detonation of the air/fuel mixture ahead of the flame front during combustion,
introducing the cooled and compressed air into the combustion cylinder,
introducing the fuel at a timed rate into the combustion cylinder to form the air/fuel mixture,
combusting the air/fuel mixture whereby the air/fuel mixture has an elapsed time of combustion over a minimum crank angle duration of 45° after top dead center, and
exhausting products of combustion from the combustion cylinder.

18. The method of claim 17 where,
the fuel is introduced into the combustion cylinder intermittently during combustion to provide a controlled energy release to maintain peak combustion temperature below the approximate temperature at which $NO_x$ forms.

19. The method of claim 17 where,
the fuel is introduced into the combustion cylinder at a timed rate extending from a range starting at 45° before top dead center to 35° after top dead center and ending within a range from 45° to 200° after top dead center.

20. The method of claim 17 where,
the fuel is introduced into the combustion cylinder at a timed rate from a range starting at 45° before top dead center to 35° after top dead center and ends within a range from 45° to 90° after top dead center.

21. The method of claim 17 where,
the fuel is introduced into the combustion cylinder at a timed rate from a range starting at 45° before top dead center to 35° after top dead center and ends within a range from 35° to 180° after top dead center.

22. The method of claim 17 where,
the fuel is introduced into the combustion cylinder at a timed rate from a range starting at 45° before top dead center to 35° after top dead center and ends within a range from 45° to 200° after top dead center.

23. The method of claim 17 including,
controlling the timed rate of fuel injection, compression of the air, and temperature of the fuel mixture to maintain combustion pressure in the combustion cylinder at a substantially constant pressure during an elapsed time of combustion over a minimum crank angle duration of 45° after top dead center.

24. The method of claim 23 including,
expanding the exhausted products of combustion in an expansion cylinder having a piston connected by a crank arm to a crank shaft thereby applying a driving force to the crank shaft.

25. The method of claim 24 including,
driving a compressor external to the expansion cylinder by the expanded exhaust products of combustion from the expansion cylinder, and delivering the compressed air to the compression cylinder.

26. The method of claim 25 including,
cooling the compressed air from the compressor before delivering the air to the compression cylinder.

27. The method of claim 26 including, admitting the cooled compressed air into the compression cylinder having a piston connected by a crank arm to the crank shaft, thereby applying a force to the crank shaft.

28. The method of claim 27 including,
increasing the pressure of the cooled compressed air by the compression stroke of the compression cylinder.

29. The method of claim 28 including,
cooling the compressed air delivered from the compression cylinder before introducing the compressed air of the air/fuel mixture into the combustion cylinder.

30. An internal combustion engine comprising,
at least one combustion cylinder having a power piston connected by a crank arm to a crank shaft,
means to introduce cooled compressed air into the combustion cylinder to form a combustible air/fuel mixture when mixed with fuel at a temperature below its autoignition temperature before combustion and being sufficiently cool to prevent detonation of the air/fuel mixture ahead of the flame front during combustion,
means to introduce the fuel into the combustion chamber at a time rate during combustion to form the cooled and compressed air/fuel mixture and effective to provide an elapsed time of combustion at substantially constant pressure over a minimum crank angle duration of 45° after top dead center,
means to begin combustion within a range starting at 35° before top dead center to 35° after to dead center and continuing combustion up to as much as 200° after top dead center, and
means to exhaust products of combustion from the combustion cylinder.

31. The internal combustion engine of claim 30 including,
means to end the combustion within a range of 45° to 200° after top dead center.

32. The internal combustion engine of claim 30 including,
means to end the combustion within a range from 45° to 90° after top dead center.

33. The internal combustion engine of claim 30 including,
means to end the combustion within a range from 90° to 180° after top dead center.

34. The internal combustion engine of claim 30 including,
means to end the combustion within a range from 180° to 200° after top dead center.

35. The internal combustion engine of claim 30 including,
means for introducing fuel to the combustible air/fuel mixture into the combustion cylinder at a timed rate effective to provide the elapsed time of combustion at substantially constant pressure from a range starting at 45° before top dead center to 35° after to dead center and ending within a range from 45° to 200° after top dead center.

36. The internal combustion engine of claim 30 where,
the means for introducing fuel of the air/fuel mixture into the combustion cylinder at a timed rate effective to provide the elapsed time of combustion at substantially constant pressure from a range starting at 45° before top dead center to 35° after top dead center and ending within a range from 45° to 90° after top dead center.

37. The internal combustion engine of claim 30 where,
the means for introducing fuel of the air/fuel mixture into the combustion cylinder at a timed rate effective to provide the elapsed time of combustion at substantially constant pressure from a range starting at 45° before top dead center to 35° after top dead center and ending within a range from 90° to 180° after top dead center.

38. The internal combustion engine of claim 30 where,
the means for introducing fuel of the air/fuel mixture into the combustion cylinder at a timed rate effective to provide the elapsed time of combustion at substantially constant pressure from a range starting at 45° before top dead center to 35° after top dead center and ending within a range from 180° to 200° after top dead center.

39. The internal combustion engine of claim 30 including,
at least one expansion cylinder having a piston connected by a crank arm to the crank shaft, and
means to introduce the exhaust products of combustion into the expansion cylinder thereby applying a driving force to the crank shaft.

40. The internal combustion engine of claim 30 including,
means to drive a compressor external to the expansion cylinder by the expanded exhaust products of combustion from the expansion cylinder, and
means to cool air compressed by the compressor.

41. The internal combustion engine of claim 40 including,
at least one compression cylinder having a piston connected to and driven by the crank shaft, and
means for introducing the cooled compressed air into the compression cylinder, and
means to increase the pressure of the cooled compressed air in the compression cylinder.

42. The internal combustion engine of claim 41 including,
means to cool the compressed air from the compression cylinder before mixing with fuel to form the air/fuel mixture.

43. The internal combustion engine of claim 42 including,
means to deliver the air/fuel mixture to the combustion cylinder.

44. An internal combustion engine comprising,
at least one combustion cylinder having a power piston connected by a crank arm to a crank shaft,
at least one expansion cylinder having an expansion piston connected by a crank arm to the crank shaft,
at least one compression cylinder having a compression piston connected by a crank arm to a crank shaft,
means to provide cooled air to the compression cylinder,
means to introduce compressed air from the compression cylinder into the combustion cylinder including means to cool the compressed air to a temperature when mixed with fuel to form a combustible air/fuel mixture below its autoignition temperature before combustion, the air/fuel mixture being sufficiently cool to prevent detonation of the mixture ahead of the flame front during combustion, means to introduce the fuel into the cooled compressed air at a timed rate to form the combustible air/fuel mixture, means to combust the air/fuel mixture int he combustion cylinder whereby the air/fuel mixture has an elapsed time of combustion over a minimum crank angle duration of 45° after top dead center, means to exhaust products of combustion from the combustion cylinder into the expansion cylinder thereby driving the expansion piston, means to exhaust the expanded products of combustion from the expansion cylinder.

45. The internal combustion engine of claim 44 where the means to introduce compressed air to the compression cylinder comprises, a compressor precompressing the air before introducing the air into the compression cylinder, and the means to cool the compressed air comprises a heat exchanger effective to cool the precompressed air from the compressor to below the autoignition temperature when mixed with fuel before it is introduced into the combustion cylinder.

46. A method of increasing performance of an internal combustion engine comprising, combusting, in a combustion chamber having positive displacement means operable to rotate an output shaft in response thereto, cooled compressed air mixed with fuel to form a combustible fuel mixture having a temperature below its autoignition temperature before combustion, the air/fuel mixture being sufficiently cool to prevent detonation of the air/fuel mixture ahead of the flame front during combustion, introducing the fuel into the combustion chamber at a timed rate during combustion whereby, at least a portion of the combustion has an elapsed time of combustion at a substantially constant pressure over a minimum rotation of the positive displacement means of 45° after top dead center, and exhausting products of combustion from the chamber at a pressure of at least 40% of the substantially constant pressure of combustion.

47. An internal combustion engine comprising, at least one combustion chamber, positive displacement means in the chamber responsive to combustion therein, an output shaft, means connecting the positive displacement means to the output shaft operable to rotate the shaft on displacement of the positive displacement means, means to introduce cooled compressed air into the combustion chamber to form a combustible air/fuel mixture when mixed with fuel at a temperature below its autoignition temperature before combustion thereby eliminating detonation of the mixture ahead of the flame front during combustion, means to introduce the fuel into the combustion chamber at a timed rate during combustion to form the cooled and compressed air/fuel mixture and effective to provide an elapsed time of combustion at substantially constant pressure for a minimum rotation of the positive displacement means of 45° after top dead center, means to combust the air/fuel mixture, combustion of the air/fuel mixture in the chamber operable to displace the positive displacement means including combusting ht air/fuel mixture for an elapsed time of combustion for a minimum rotation of the positive displacement means of 45° after top dead center, and means to exhaust products of combustion from the combustion chamber.

* * * * *

UNITED STATES PATENT AND TRADEMARK OFFICE
CERTIFICATE OF CORRECTION

PATENT NO. : 5,103,645
DATED : April 14, 1992
INVENTOR(S) : John M. Haring et al It is certified that error appears in the above-indentified patent and that said Letters Patent is hereby corrected as shown below:

Column 11, line 38, "valve 1" should read --valve 5--.

Column 11, line 41, "valve 2" should read --valve 6--.

Column 11, line 42, "valve 3" should read --valve 7--.

Column 11, line 43, "injection 4" should read --injection 8--.

Column 11, line 43, "Combustion 5" should read --Combustion 1--.

Column 11, lines 44-45, "injection 6" should read --injection 2--.

Column 11, line 46, "pressure 7" should read --pressure 3--.

Column 11, line 47, "valve 8" should read --valve 4--.

UNITED STATES PATENT AND TRADEMARK OFFICE
CERTIFICATE OF CORRECTION

PATENT NO. : 5,103,645
DATED : April 14, 1992
INVENTOR(S) : John M. Haring et al It is certified that error appears in the above-indentified patent and that said Letters Patent is hereby corrected as shown below:

Column 18, line 31, "ht" should read --the--.

Signed and Sealed this

Twenty-fifth Day of January, 1994

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,103,645
DATED : April 14, 1992
INVENTOR(S) : John M. Haring

It is certified that error appears in the above-indentified patent and that said Letters Patent is hereby corrected as shown below:

On the title page, item [73] Assignee: should read as follows:

--[73] Assignee: Thermon Manufacturing Company, San Marcos, Tex. (Part Interest)--.

Signed and Sealed this

Twenty-sixth Day of April, 1994

Attest:

BRUCE LEHMAN

*Attesting Officer*     *Commissioner of Patents and Trademarks*